(12) United States Patent
Ito (10) Patent No.: US 9,902,365 B2
(45) Date of Patent: Feb. 27, 2018

(54) THROUGH ANCHOR

(71) Applicant: Enshu CO., Ltd, Iwata-shi, Shizuoka (JP)

(72) Inventor: Tadao Ito, Shizuoka (JP)

(73) Assignee: Enshu CO., Ltd, Iwata-shi (JP)

( * ) Notice: Subject to any disclaimer, the term of this patent is extended or adjusted under 35 U.S.C. 154(b) by 0 days.

(21) Appl. No.: 14/931,873

(22) Filed: Nov. 4, 2015

(65) Prior Publication Data

US 2016/0052488 A1 Feb. 25, 2016

Related U.S. Application Data

(63) Continuation of application No. 13/883,763, filed as application No. PCT/JP2010/073461 on Dec. 24, 2010, now Pat. No. 9,365,185.

(30) Foreign Application Priority Data

Nov. 9, 2010 (JP) ................................. 2010-250919

(51) Int. Cl.
*B60R 22/24* (2006.01)
*B60R 22/18* (2006.01)

(52) U.S. Cl.
CPC ...... *B60R 22/24* (2013.01); *B60R 2022/1818* (2013.01)

(58) Field of Classification Search
CPC ................................ B60R 22/18; B60R 22/24
See application file for complete search history.

(56) References Cited

U.S. PATENT DOCUMENTS

| | | |
|---|---|---|
| 3,959,855 A | 6/1976 | Fisher |
| 6,502,861 B2 | 1/2003 | Specht |
| 6,688,647 B2 | 2/2004 | Koketsu |
| 2001/0043006 A1 | 11/2001 | Iseki |

(Continued)

FOREIGN PATENT DOCUMENTS

| | | |
|---|---|---|
| DE | 2825548 A1 | 12/1979 |
| DE | 10210781 | 10/2003 |

(Continued)

OTHER PUBLICATIONS

Kawai et al., Seat Belt Device, Nov. 21, 2000, JPO, JP 2000-318573 A, Machine Translation of Description.*

(Continued)

*Primary Examiner* — James A English
(74) *Attorney, Agent, or Firm* — SOLARIS Intellectual Property Group, PLLC (57) ABSTRACT

In a through anchor (10), a guide piece (24) is molded in an area around a through hole (16) in an anchor plate (12), webbing (30) is inserted through an insertion hole (26) in the guide piece (24) in such a way that the webbing is movable along a lengthwise direction, and the webbing (30) is slidably supported on a sliding surface (28) of the guide piece (24). Here, the guide piece (24) is placed only on the whole circumference of the through hole (16) in the anchor plate (12) and allows an entire outer peripheral end surface (12C) of the anchor plate (12) to be exposed. For this reason, the use amount of molding resin of the guide piece (24), which is molded from a relatively high-grade resin, and the cost of the through anchor (10) can be reduced.

7 Claims, 7 Drawing Sheets

(56) References Cited

U.S. PATENT DOCUMENTS

| | | | |
|---|---|---|---|
| 2003/0020271 A1 | 1/2003 | Okubo | |
| 2004/0227341 A1 | 11/2004 | Hattori | |
| 2007/0138783 A1 | 6/2007 | Gleason et al. | |
| 2007/0273138 A1 | 11/2007 | You | |
| 2009/0179412 A1* | 7/2009 | Gray | A44B 11/2561 280/801.1 |
| 2012/0091781 A1 | 4/2012 | Tabata et al. | |
| 2013/0240662 A1 | 9/2013 | Ito | |

FOREIGN PATENT DOCUMENTS

| | | |
|---|---|---|
| DE | 10210781 A1 | 10/2003 |
| GB | 1280153 A | 7/1972 |
| JP | 5-044719 | 6/1993 |
| JP | 9-290706 | 11/1997 |
| JP | 11-165610 | 6/1999 |
| JP | 2000-142316 | 5/2000 |
| JP | 2000-153750 | 6/2000 |
| JP | 2000-159058 | 6/2000 |
| JP | 2000-318573 | 11/2000 |
| JP | 2000318573 A * | 11/2000 |
| JP | 2001-001861 | 1/2001 |
| JP | 2001-138862 | 5/2001 |
| JP | 2002-104133 | 4/2002 |
| JP | 2004-338477 | 12/2004 |

OTHER PUBLICATIONS

Kawai et al., Seat Belt Device, Nov. 21, 2000, JPO, JP 2000-318573 A, English Abstract.*
Hiroshi Tomita, Guide Anchor for Seat Belt, Apr. 10, 2002, JPO, JP 2002-104133 A, Machine Translation of Description.*
Hiroshi Tomita, Guide Anchor for Seat Belt, Apr. 10, 2002, JPO, JP 2002-104133 A, English Abstract.*
Extended European Search Report dated Mar. 25, 2015 issued in corresponding EP application.
Japanese Office Action dated Jun. 10, 2014 issued in corresponding Japanese application.
Japanese Office Action dated Apr. 14, 2015, issued in corresponding Japanese application.
Japanese Office Action dated Jul. 7, 2015, issued in corresponding Japanese application.
European Office Action dated Feb. 19, 2016, issued in corresponding EP Patent Application No. 10859523.2.
Non-Final Office Action dated Jan. 5, 2016, issued in U.S. Appl. No. 13/883,763.

* cited by examiner

THROUGH ANCHOR

CROSS-REFERENCE TO RELATED APPLICATIONS

This application is a continuation of, and claims priority under 35 USC 120 to, U.S. application Ser. No. 13/883,763, filed May 7, 2013, which was a national stage entry of PCT application PCT/JP2010/073461, filed Dec. 24, 2010, which claimed priority under 35 USC 119 to Japanese Patent Application 2010-250919, filed Nov. 9, 2010. All the disclosures listed above are incorporated by reference herein.

TECHNICAL FIELD

The present invention relates to a through anchor that is used for inserting there through a seat belt webbing worn by a vehicle occupant.

BACKGROUND ART

In the belt connecting metal fitting corresponding to a through anchor described in patent citation 1 listed below, a resin molding material is integrally molded on an area around a through hole in a metal plate and webbing is inserted through, whereby the webbing is slidably supported on the resin molding material.

Further, it is necessary that the webbing smoothly slide in the belt connecting metal fitting and it is necessary to reduce the wear of the belt connecting metal fitting caused by the sliding of the webbing. For this reason, generally the resin molding material is manufactured from a relatively high-grade resin whose friction coefficient is low and whose wear resistance is high.

However, in this belt connecting metal fitting, the resin molding material covers the outer peripheral end surface of the metal plate from the inner periphery of the through hole in the lower side section of the metal plate. For this reason, the use amount of synthetic resin material, which is a relatively high-grade resin, increases.

Because of this, when molding the resin molding material on the metal plate, the use amount of the resin molding material increases, the molding time becomes longer, and the molding equipment for the resin molding material becomes larger in size. Moreover, in processing the belt connecting metal fitting when a molding defect in the resin molding material has occurred or when scrapping the vehicle, separating the resin molding material, in which the use amount of the relatively high-grade resin is large, from the metal plate is cumbersome, so the loss cost is high.

Patent Citation 1: JP-A No. 2001-138862

DISCLOSURE OF INVENTION

Technical Problem

In consideration of the above-described circumstances, it is an object of the present invention to obtain a through anchor whose cost can be reduced.

Solution to Problem

A through anchor of a first aspect of the present invention comprises: a main body member, in which is formed a through hole through which is inserted webbing worn by an occupant of a vehicle; and a sliding supporting member that is secured to an area around the through hole, but not at an entire outer peripheral end surface of the main body member, and that slidably supports the webbing.

A through anchor of a second aspect of the present invention comprises: a main body member that is equipped with an attachment portion attached to a vehicle and in which is formed a through hole for webbing worn by an occupant; and a sliding supporting member that is placed on an inner periphery of the through hole in the main body member and a peripheral edge of the through hole, that is for guiding sliding of the webbing, that sandwiches the main body member from front and back, and that is attached to the main body member.

A through anchor of a third aspect of the present invention is the through anchor of the first aspect or the second aspect of the present invention and further comprises a locking portion that is disposed in an area around the through hole in the main body member, and that locks the sliding supporting member.

A through anchor of a fourth aspect of the present invention is the through anchor of any one of the first aspect to the third aspect of the present invention and further comprises a covering member that is fastened to at least one of the main body member or the sliding supporting member, and that covers the main body member.

A through anchor of a fifth aspect of the present invention is the through anchor of the fourth aspect of the present invention, wherein the covering member covers an outer peripheral end surface of the sliding supporting member.

A through anchor of a sixth aspect of the present invention is the through anchor of the fourth aspect or the fifth aspect of the present invention, wherein the covering member covers the main body member outside the whole circumference of the through hole.

Advantageous Effects of Invention

In the through anchor according to the first aspect of the present invention, the through hole is formed in the main body member, and the webbing worn by the occupant of the vehicle is inserted through the through hole. The sliding supporting member is secured to the area around the through hole in the main body member, and the sliding supporting member slidably supports the webbing.

Here, the sliding supporting member is not secured at the entire outer peripheral end surface of the main body member. For this reason, the use amount of the sliding supporting member can be reduced and the cost can be reduced.

In the through anchor of the second aspect of the present invention, the through hole for the webbing worn by the occupant is formed in the main body member equipped with the attachment portion attached to the vehicle. The sliding supporting member is placed on the inner periphery of the through hole in the main body member and the peripheral edge of the through hole, and the sliding supporting member is for guiding the sliding of the webbing.

Here, the sliding supporting member sandwiches the main body member from front and back and is attached to the main body member. For this reason, in contrast to a case where the sliding supporting member surrounds the outer peripheral end surface from the inner periphery of the through hole in the main body member, the sliding supporting member can be easily detached and separated from the main body member. Because of this, the loss cost can be lowered and the cost can be reduced.

In the through anchor of the third aspect of the present invention, the locking portion is disposed in the area around the through hole in the main body portion, and the locking portion locks the sliding supporting member. For this reason, positional misalignment of the sliding supporting member with respect to the main body member can be suppressed.

In the through anchor of the fourth aspect of the present invention, the covering member is fastened to at least one of the main body member or the sliding supporting member, and the covering member covers the main body member. For this reason, the appearance can be easily changed by changing the covering member.

In the through anchor of the fifth aspect of the present invention, the covering member covers the outer peripheral end surface of the sliding supporting member. For this reason, the covering member can make the outer peripheral end surface of the sliding supporting member concealable.

In the through anchor of the sixth aspect of the present invention, the covering member covers the main body member outside the whole circumference of the through hole. For this reason, the appearance can be effectively changed by changing the covering member.

BEST MODE FOR CARRYING OUT THE INVENTION

Figure 1:
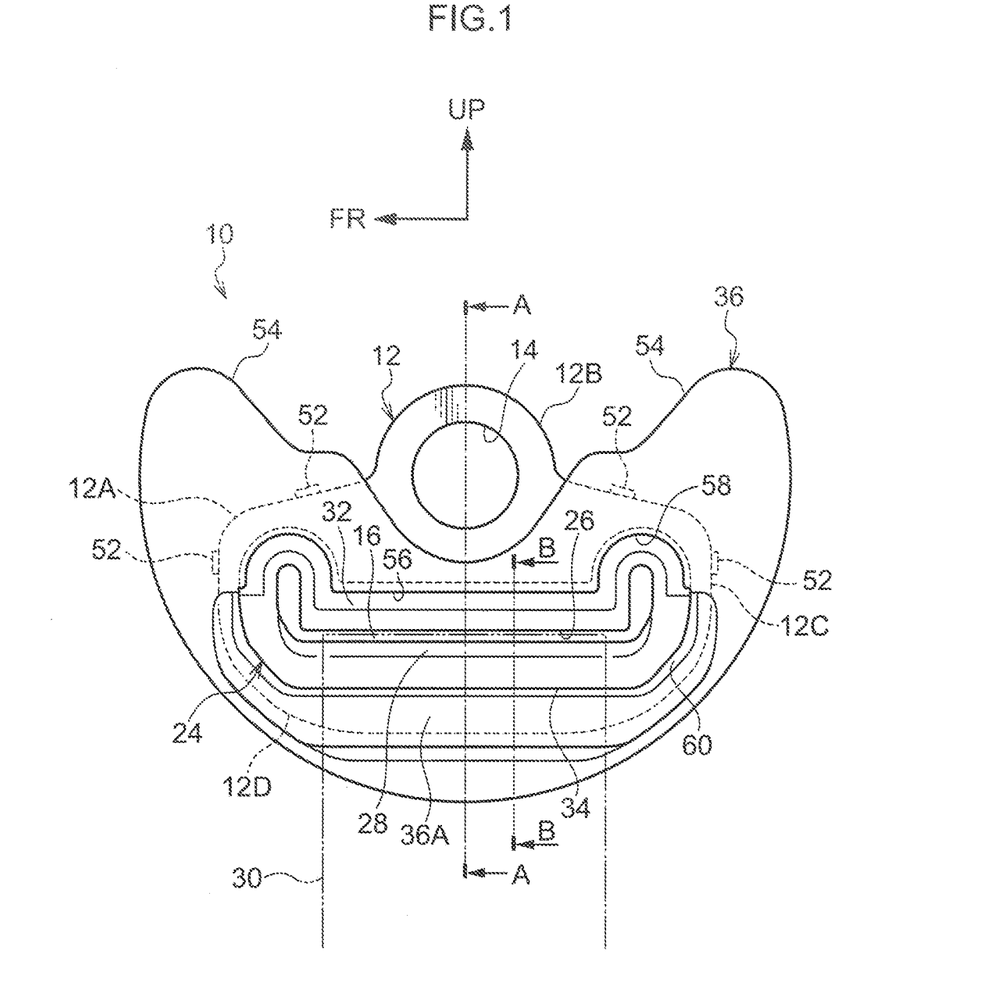
FIG. 1 is a front view showing a through anchor pertaining to an embodiment of the present invention as seen from inside in a vehicle width direction in a state in which the through anchor is attached to a vehicle.
Figure 2:
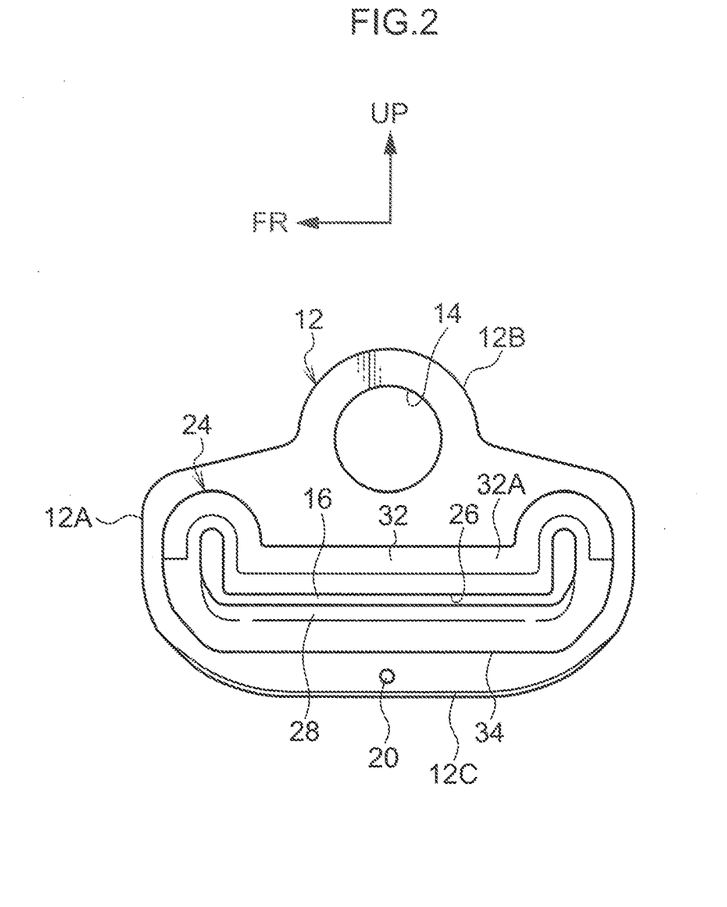
FIG. 2 is a front view showing an anchor plate and a guide piece of the through anchor pertaining to the embodiment of the present invention as seen from inside in the vehicle width direction in the state in which the through anchor is attached to the vehicle.
Figure 3A:
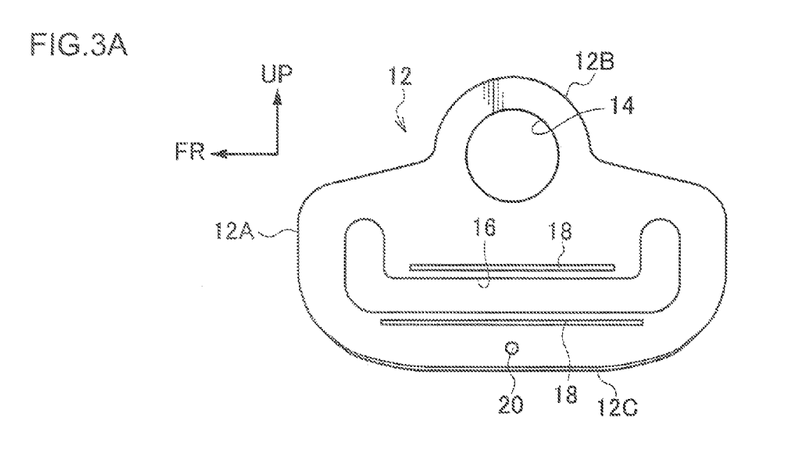
FIG. 3A is a front view showing the anchor plate of the through anchor pertaining to the embodiment of the present invention as seen from inside in the vehicle width direction in the state in which the through anchor is attached to the vehicle.
Figure 3B:
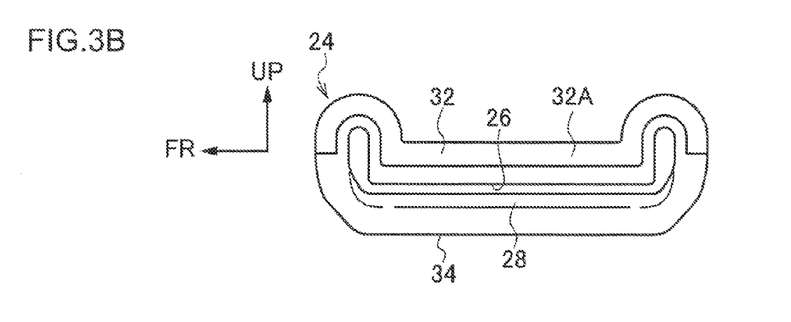
FIG. 3B is a front view showing the guide piece in a state in which the guide piece has been separated from the anchor plate in the through anchor pertaining to the embodiment of the present invention as seen from inside in the vehicle width direction in the state in which the through anchor is attached to the vehicle.
Figure 3C:
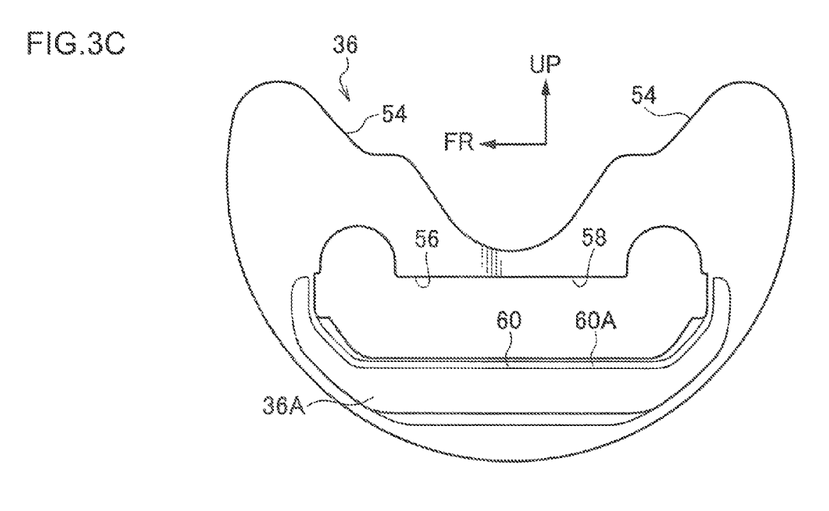
FIG. 3C is a front view showing a cover of the through anchor pertaining to the embodiment of the present invention as seen from inside in the vehicle width direction in the state in which the through anchor is attached to the vehicle.
Figure 4:
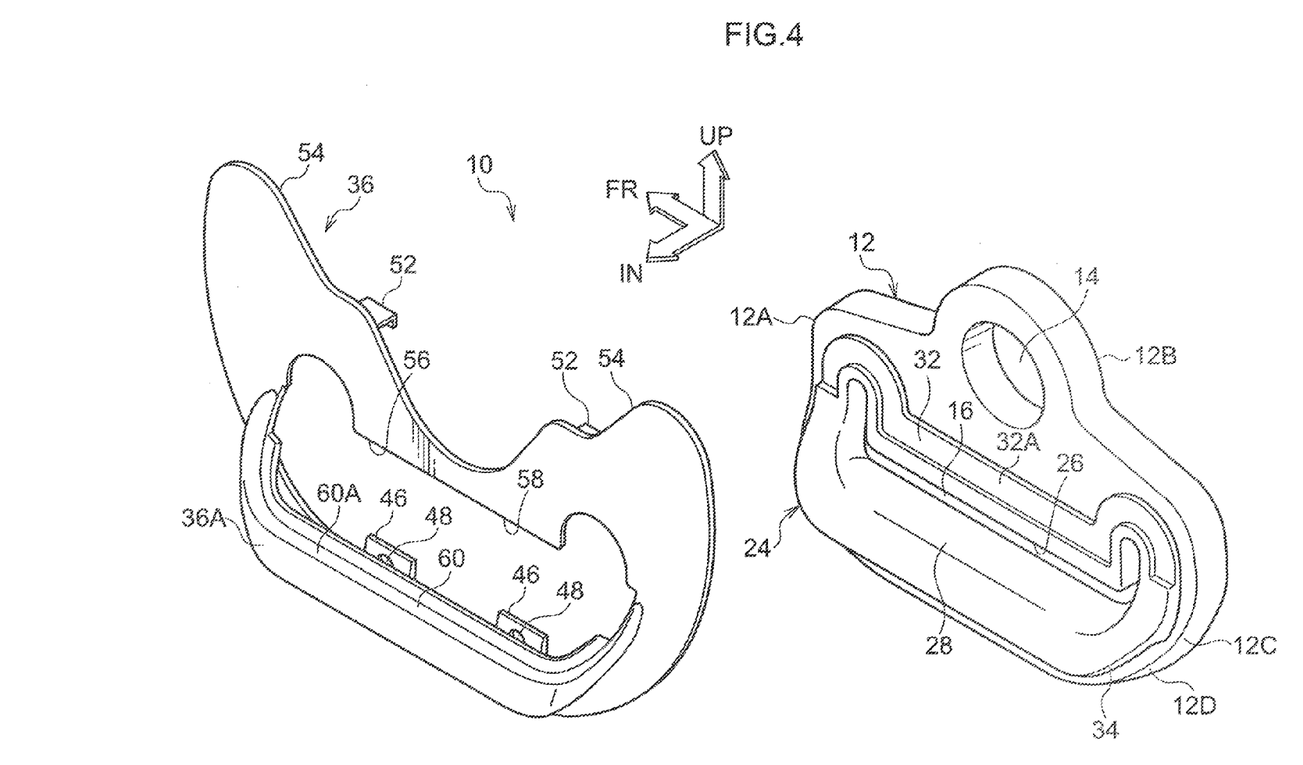
FIG. 4 is an exploded perspective view showing the through anchor pertaining to the embodiment of the present invention.
Figure 5:
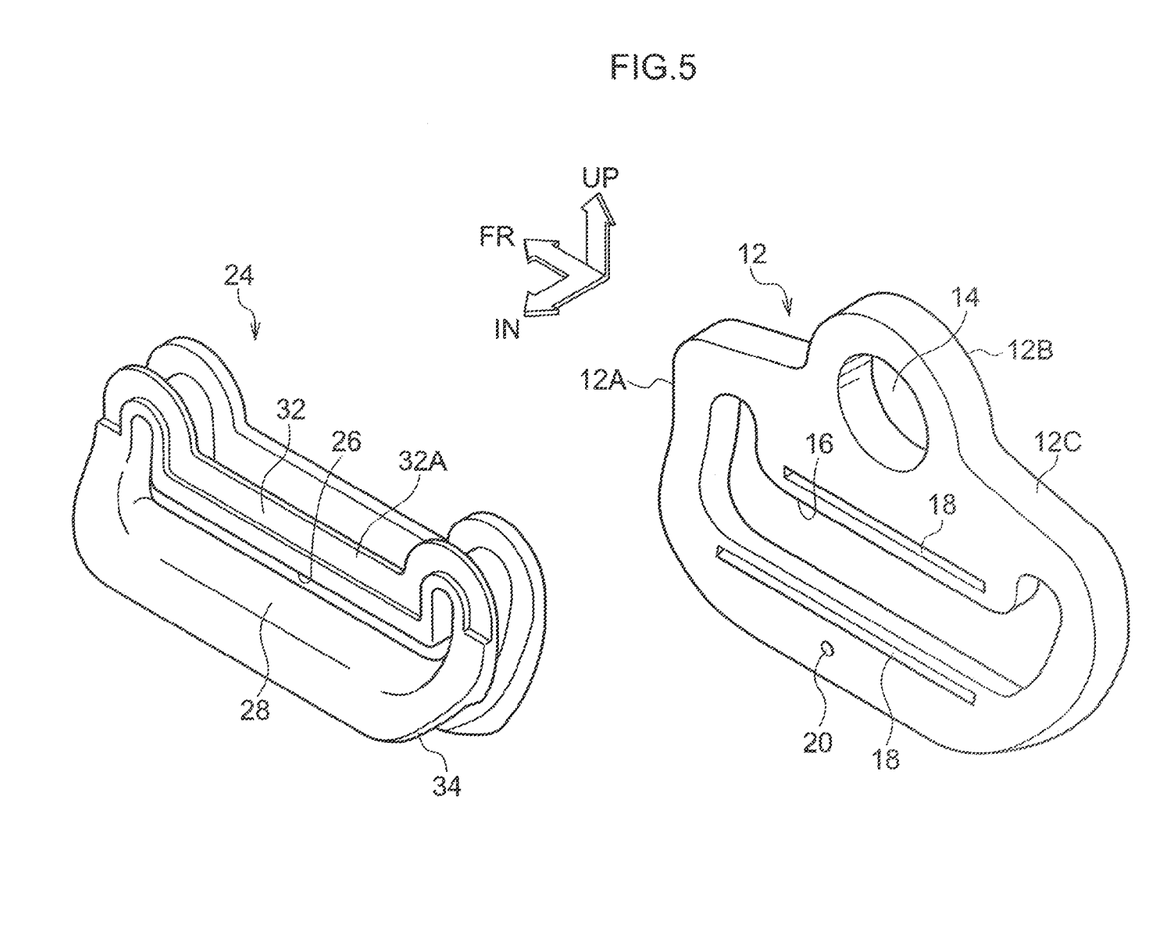
FIG. 5 is a perspective view showing a state in which the guide piece has been separated from the anchor plate of the through anchor pertaining to the embodiment of the present invention.

In FIG. 1, a through anchor 10 (a webbing suspender) pertaining to an embodiment of the present invention is shown in a front view as seen from inside in a vehicle width direction in a state in which the through anchor 10 is attached to a vehicle, and in FIG. 4, an exploded perspective view of the through anchor 10 is shown. In the drawings, arrow FR represents the front of a vehicle in a case where the through anchor 10 is attached to a vehicle, arrow IN represents inside in a vehicle width direction, and arrow UP represents up.

The through anchor 10 pertaining to the present embodiment is used in a so-called 3-point seat belt device as a so-called slip joint (shoulder anchor) and is placed in a required position in the upper portion of a vehicle body on the vehicle width direction outside and the vehicle rear side of a seat (not shown in the drawings) for an occupant of a vehicle (automobile) to sit in.

Figure 6A:
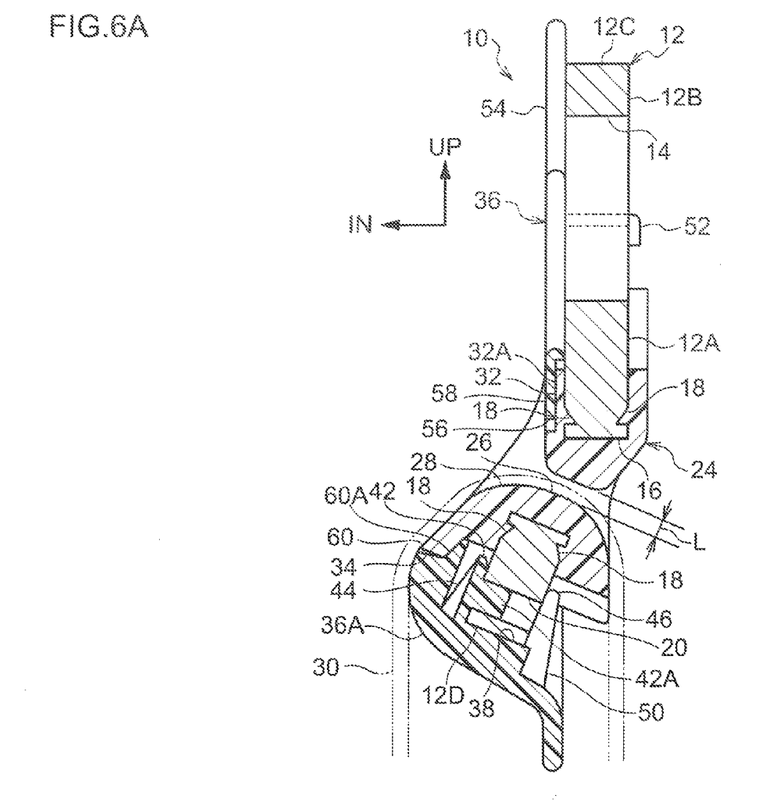
FIG. 6A is a cross-sectional view (a cross-sectional view along line A-A of FIG. 1) showing the through anchor pertaining to the embodiment of the present invention.

As shown in FIG. 1, FIG. 2, FIG. 3A, FIG. 5, and FIG. 6A, the through anchor 10 has a plate-shaped anchor plate 12 that is made of metal (steel) and serves as a main body member (strength member), and the anchor plate 12 is manufactured by stamping. As shown in FIG. 6A, the longitudinal cross-sectional up-and-down intermediate portion of the anchor plate 12 is bent, and the lower side of this bent portion is inclined in a direction heading inward in the vehicle width direction.

The upper portion of a generally rectangular plate-shaped main body portion 12A of the anchor plate 12 is a substantially semicircular plate-shaped projecting portion 12B, and the projecting portion 12B projects upward from the vehicle front-and-rear direction center portion of the main body portion 12A.

A circular securing hole 14 serving as an attachment portion is formed through the upper side portion of the anchor plate 12 (in a range from the upper portion of the main body portion 12A to the projecting portion 12B), and the anchor plate 12 is turnably secured (attached) in the required position of the vehicle body by a bolt (not shown in the drawings) fitted into the securing hole 14. For this reason, the through anchor 10 is secured in the required position of the vehicle body in a state in which the through anchor 10 is made turnable in the vehicle front-and-rear direction about this bolt.

A through hole 16 having a U shape as seen from the vehicle width direction is formed through the bent portion of the up-and-down direction intermediate portion of the anchor plate 12; the center portion of the through hole 16 extends in the vehicle front-and-rear direction, and the vehicle front side end portion and the vehicle rear side end portion of the through hole 16 extend at substantially right angles upward.

Figure 6B:
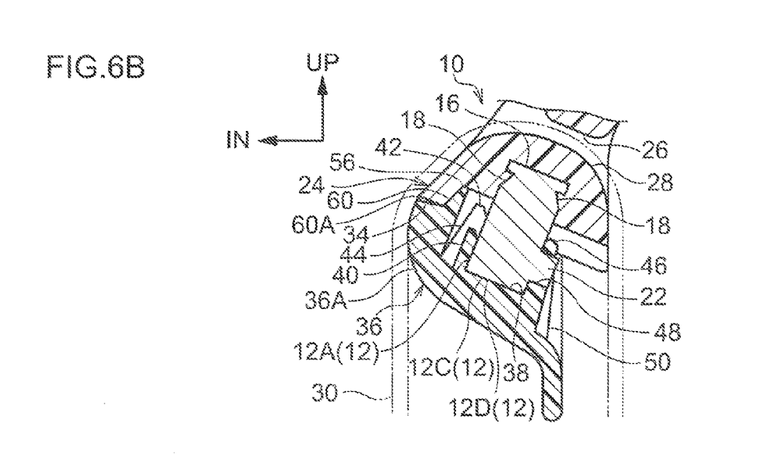
FIG. 6B is a cross-sectional view (a cross-sectional view along line B-B of FIG. 1) showing the through anchor pertaining to the embodiment of the present invention.
Figure 7:
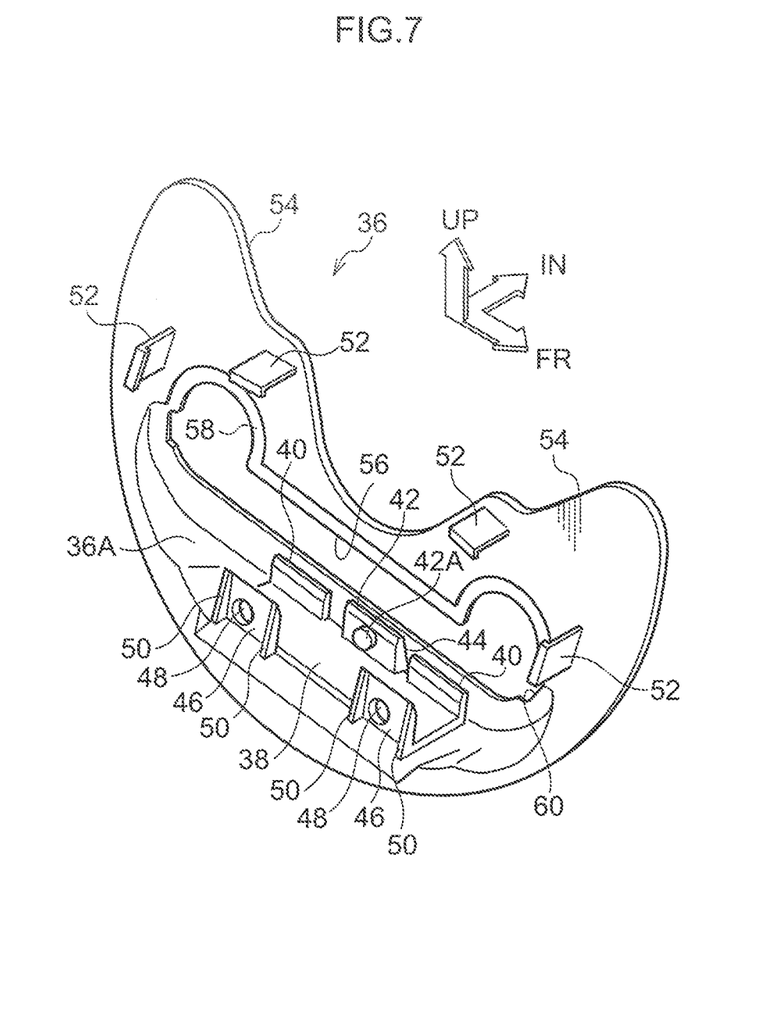
FIG. 7 is a perspective view showing the cover of the through anchor pertaining to the embodiment of the present invention as seen from outside in the vehicle width direction in the state in which the through anchor is attached to the vehicle.

As shown in FIG. 6A and FIG. 6B, cross-sectionally triangular locking grooves 18 serving as locking portions are formed in the vehicle width direction inside surface and the vehicle width direction outside surface of the anchor plate 12 on the upper side and the lower side of the center portion of the through hole 16, and the locking grooves 18 are configured to be long along the center portion of the through hole 16. The maximum depth of the locking grooves 18 is made equal to or greater than 0.1 mm and equal to or less than 1.5 mm, for example.

A circular engaging hole 20 that configures a positioning component is formed through the vehicle front-and-rear direction center portion of the lower end portion of the anchor plate 12 (the lower end portion of the main body portion 12A), and the engaging hole 20 corresponds to an engaging projection 42A of a cover 36 described later. Moreover, as shown in FIG. 6B, circular column-shaped engaging columns 22 that configure the positioning component are formed on the vehicle width direction outside lower end portion of the anchor plate 12 on the vehicle front side and the vehicle rear side of the engaging hole 20, and the engaging columns 22 correspond to engaging holes 48 in the cover 36 described later.

As shown in FIG. 1, FIG. 2, FIG. 3B, FIG. 4, FIG. 5, and FIG. 6A, a guide piece 24 made of resin and serving as a sliding supporting member (insertion portion) is molded by integral molding (insert molding) on the lower side portion of the anchor plate 12 (the up-and-down direction intermediate portion of the main body portion 12A), and the guide piece 24 covers the whole circumference of the through hole 16 (the peripheral edge and the inner peripheral surface in the entire circumferential direction of the through hole 16) in the anchor plate 12 from the vehicle width direction inside and the vehicle width direction outside. The guide piece 24 is placed only in the neighborhood of the whole circumference of the through hole 16, and the guide piece 24 takes an entire outer peripheral end surface 12C of the anchor plate 12 as an exposed portion 12D where the guide piece 24 is not disposed. As shown in FIG. 6A and FIG. 6B, parts of the guide piece 24 enter the locking grooves 18 of the anchor plate 12, and because of this, the guide piece 24 is locked in the locking grooves 18 and is secured without misalignment.

An insertion hole 26 having a U shape as seen from the vehicle width direction is formed through the guide piece 24, and the insertion hole 26 is placed inside the through hole 16 in the anchor plate 12 and is made into a smaller, substantially similar shape compared to that of the through hole 16. As shown in FIG. 6A and FIG. 6B, the cross section of the guide piece 24 along the vehicle width direction is made into a U shape outside the whole circumference of the insertion hole 26; in the guide piece 24, the lower side surface of the insertion hole 26 is made into a sliding surface 28 (supporting surface), and the cross section of the sliding surface 28 along the vehicle width direction is curved in a semicircular shape.

Long band-like webbing 30 is inserted through (passed through) the center portion of the insertion hole 26 (the center portion of the through hole 16) in such a way as to be movable in the lengthwise direction. The base end side of the webbing 30 on the vehicle width direction outside (vehicle outside) of the insertion hole 26 extends below the through anchor 10 and is refracted by a retractor (not shown in the drawings), and the retractor is secured to the vehicle width direction outside and lower side of the seat for the occupant to sit in and urges the webbing 30 in a retraction direction. The distal end side of the webbing 30 on the vehicle width direction inside (cabin side) of the insertion hole 26 extends below the through anchor 10 and is secured to the vehicle width direction outside and lower side of the seat. For this reason, the webbing 30 is brought into contact with the sliding surface 28 of the insertion hole 26 by urging force resulting from the retractor and is supported (suspended) in a looped-back state, and when the webbing 30 is moved in the lengthwise direction with respect to the insertion hole 26, the webbing 30 slides on and is guided by the sliding surface 28. A width dimension L of the center portion of the insertion hole 26 (the dimension in the direction perpendicular to the thickness direction of the section of the anchor plate 12 on the lower side of the insertion hole 26 and the lengthwise direction (the vehicle front-and-rear direction) of the center portion of the insertion hole 26; see FIG. 6A) is made equal to or greater than the thickness of the webbing 30 and equal to or less than twice the thickness of the webbing 30 in the entire lengthwise direction of the center portion of the insertion hole 26 (may also be in only the lengthwise direction center portion or only both lengthwise direction end portions).

The distal end side of the webbing 30 with respect to the through anchor 10 (the insertion hole 26) is inserted through a tongue (not shown in the drawings), and the tongue is made movable along the lengthwise direction of the webbing 30. A buckle (not shown in the drawings) is attached to the vehicle width direction inside and the lower side of the seat, and when the webbing 30 is withdrawn counter to the urging force from the retractor and the tongue is engaged with the buckle, the webbing 30 is worn by an occupant (not shown in the drawings) seated in the seat.

When the webbing 30 is worn by the occupant, the distal end side of the webbing 30 with respect to the through anchor 10 (the insertion hole 26) extends diagonally downward toward the vehicle front from the through anchor 10, and the through anchor 10 is turned toward the vehicle front side. Moreover, in the event of a vehicle emergency (at the time of a collision, etc.), the withdrawal of the webbing 30 from the retractor is locked by the retractor.

The guide piece 24 is manufactured from a relatively high-grade resin (e.g., POM resin) whose friction coefficient is low and whose wear resistance, rigidity, and heat resistance are high. Because of this, the webbing 30 is smoothly slid on the sliding surface 28 of the guide piece 24, and wear of the sliding surface 38 caused by the sliding of the webbing 30 is reduced.

A fitting groove 32 made thin-walled via a step portion is formed and serves as a fitting component on the whole circumference of the upper side section of the vehicle width direction inside upper end portion of the guide piece 24. The fitting groove 32 corresponds to a fitting portion 58 of the cover 36 described later. A plate-shaped insertion portion 34 that configures the fitting component is formed on the whole circumference of the lower side section of the vehicle width direction inside end portion of the guide piece 24, and the insertion portion 24 projects like an eave in a direction away from the insertion hole 26 outside the outer periphery from the vehicle width direction inside end portion of the guide piece 24, has a space disposed between it and the anchor plate 12, and corresponds to an insertion groove 60 of the cover 36 described later.

As shown in FIG. 1, FIG. 3C, FIG. 4, FIG. 6A, and FIG. 7, a substantially C-shaped plate-shaped cover 36 serving as a covering member is disposed on the vehicle width direction inside of the anchor plate 12. The cover 36 is configured by a relatively lower-grade resin (e.g., PP resin or ABS resin) than that of the guide piece 24. A housing portion 36A having a substantially L-shaped cross section as seen from the vehicle front-and-rear direction is formed on the lower portion of the cover 36, the housing portion 36A projects inward in the vehicle width direction, and the section of the anchor plate 12 on the lower side of the bent portion is housed in the housing portion 36A.

A rectangular plate-shaped contact plate 38 that configures the positioning component is formed on the lower surface in the housing portion 36A. A pair of rectangular tab-shaped pressing tabs 40 and a rectangular tab-shaped engaging tab 42 that configure the positioning component are formed projecting on the vehicle width direction inside end of the upper surface of the contact plate 38, and the engaging tab 42 is placed between the pair of pressing tabs 40. A circular column-shaped engaging projection 42A is formed on the engaging tab 42, and the engaging projection 42A projects outward in the vehicle width direction from the engaging tab 42 and corresponds to the engaging hole 20 in the anchor plate 12. Triangular plate-shaped reinforcing ribs 44 are formed on the vehicle front side end and the vehicle rear side end of the vehicle width direction inside surface of the engaging tab 42, and the reinforcing ribs 44 are made integral with the contact plate 38 and the cover 36 and reinforce the engaging tab 42.

A pair of rectangular tab-shaped locking tabs 46 that configure the positioning component are formed projecting on the vehicle width direction outside end of the upper surface of the contact plate 38, and the pair of locking tabs 46 oppose the pair of pressing tabs 40 in the vehicle width direction. Circular locking holes 48 are formed through the locking tabs 46, and the locking holes 48 correspond to the engaging columns 22 of the anchor plate 12. Triangular plate-shaped reinforcing ribs 50 are formed on the vehicle front side ends and the vehicle rear side ends of the vehicle width direction outside surfaces of the locking tabs 46, and the reinforcing ribs 50 are made integral with the contact plate 38 and the cover 36 and reinforce the locking tabs 46.

A predetermined number (in the present embodiment, a total of four) of fastening claws 52 (fasteners) that configure a fastening component are formed on the vehicle front side portion and the vehicle rear side portion of the upper portion of the cover 36, and the fastening claws 52 project outward in the vehicle width direction from the cover 36 and correspond to the outer periphery of the anchor plate 12.

The lower end surface of the anchor plate 12 (the lower end of the outer peripheral end surface 12C) is in contact with the contact plate 38 of the cover 36. Moreover, the engaging projection 42A of the cover 36 is fitted into the engaging hole 20 in the anchor plate 12 by temporary elastic deformation of the engaging tab 42 of the cover 36, and the engaging columns 22 of the anchor plate 12 are fitted into the locking holes 48 in the cover 36 by temporary elastic deformation of the pressing tabs 40 and the locking tabs 46 of the cover 36 (see FIG. 6B). Moreover, the lower end of the anchor plate 12 is sandwiched and held in the vehicle width direction between the engaging tab 42, the pair of pressing tabs 40, and the pair of locking tabs 46 of the cover 36. Because of this, the cover 36 is positioned with respect to the anchor plate 12 in both sides in the up-and-down direction, both sides in the vehicle width direction, and both sides in the vehicle front-and-rear direction.

The fastening claws 52 of the cover 36 are engaged with the outer peripheral portion of the anchor plate 12 (the outer peripheral portion of the upper side of the main body portion 12A) by temporary elastic deformation, and because of this, the movement of the cover 36 upward and to both sides in the vehicle width direction and both sides in the vehicle front-and-rear direction with respect to the anchor plate 12 is regulated.

As described above, the cover 36 is fastened to the anchor plate 12, and the movement of the cover 36 to both sides in the up-and-down direction, both sides in the vehicle width direction, and both sides in the vehicle front-and-rear direction with respect to the anchor plate 12 is regulated.

The cover 36 covers the vehicle width direction inside of the section of the anchor plate 12 excluding the area around the securing hole 14, and the cover 36 extends outside the anchor plate 12 from the entire outer peripheral end surface 12C of that section of the anchor plate 12. For this reason, the webbing 30 is prevented from contacting the anchor plate 12 and sustaining damage. Further, generally triangular extending portions 54 are disposed on the vehicle front side portion and the vehicle rear side portion of the upper portion of the cover 36, and the extending portions 54 extend upward from the main body portion 12A of the anchor plate 12.

A passing hole 56 having a substantial U shape as seen from the vehicle width direction is formed through the up-and-down direction intermediate portion of the cover 36, and the passing hole 56 is made for passing (inserting) the webbing 30 through it.

A plate-shaped fitting portion 58 that configures the fitting component is formed in the cover 36 on the entire periphery of the upper side section of the passing hole 56; the fitting portion 58 is made thin-walled, projects to the passing hole 56 side from the vehicle width direction inside section of the cover 36, corresponds to the fitting groove 32 of the guide piece 24, and takes the vehicle width direction inside of this fitting groove 32 as an insertion site 32A where the fitting portion 58 is inserted toward the guide piece 24 side. An insertion groove 60 that configures the fitting component is formed in the cover 36 on the entire periphery of the lower side section of the passing hole 56 (the upper end of the housing portion 36A), and the insertion groove 60 is open to the vehicle width direction inside of the cover 36 and to the passing hole 56 side, corresponds to the insertion portion 34 of the guide piece 24, and takes the vehicle width direction inside of this insertion groove 60 as an insertion site 60A where the insertion portion 34 is inserted toward the cover 36 side.

The fitting portion 58 of the cover 36 is inserted into the insertion site 32A of the guide piece 24, and the insertion portion 34 of the guide piece 24 is inserted into the insertion site 60A of the cover 36. Because of this, the vehicle width direction inside surface of the fitting portion 58 of the cover 36 is placed on an identical plane with the vehicle width direction inside surface of the site of the guide piece 24 in the neighborhood of the fitting groove 32, the vehicle width direction inside surface of the housing portion 36A of the cover 36 in the neighborhood of the insertion groove 60 is placed on an identical curved surface with the sliding surface 28 of the guide piece 24, and the cover 36 is fitted together with the guide piece 24.

The cover 36 is made into an opaque material, and the sections of the anchor plate 12 and the guide piece 24 covered by the cover 36 are made unable to be seen from the cabin side (the vehicle width direction inside). In particular, because the fitting portion 58 of the cover 36 covers the insertion site 32A of the guide piece 24, the outer periphery of the fitting groove 32 of the guide piece 24 and the vehicle width direction inside surface (front surface) of the anchor plate 12 are made unable to be seen from the cabin side. Moreover, because the insertion site 60A of the cover 36 is inserted into the space between the insertion portion 34 of the guide piece 24 and the anchor plate 12, the vehicle width direction inside surface of the anchor plate 12 is made unable to be seen from the cabin side.

Next, the action of the present embodiment will be described.

In the through anchor 10 of the above configuration, the guide piece 24 is molded in the area around the through hole 16 in the anchor plate 12, the webbing 30 is inserted through the insertion hole 26 in the guide piece 24 in such a way as to be movable along the lengthwise direction, and the webbing 30 is slidably supported on the sliding surface 28 of the guide piece 24.

Here, the guide piece 24 is placed only on the whole circumference of the through hole 16 in the anchor plate 12 and allows the entire outer peripheral end surface 12C of the anchor plate 12 to be exposed. For this reason, the use amount of the guide piece 24 molded from the relatively high-grade resin can be reduced. Because of this, when molding the guide piece 24 on the anchor plate 12, the use amount of the molding resin of the guide piece 24 can be reduced, the molding time can be shortened, and the molding equipment for the guide piece 24 can be made compact. Moreover, in processing the through anchor 10 if a molding defect in the guide piece 24 has occurred or when scrapping the vehicle, even if the guide piece 24 molded from the relatively high-grade resin cannot be separated from the anchor plate 12, the loss cost can be lowered. Consequently, the cost of the through anchor 10 can be reduced. Moreover, the through anchor 10 can be made compact and lightweight.

Further, the guide piece 24 sandwiches the anchor plate 12 from front and back (the vehicle width direction inside and the vehicle width direction outside) and is attached to the anchor plate 12. For this reason, in contrast to a case where the guide piece 24 surrounds the outer peripheral end surface 12C from the inner periphery of the through hole 16 in the anchor plate 12, the outer peripheral end surface of the guide piece 24 is placed on the anchor plate 12, so in processing the through anchor 10 when a molding defect in the guide piece 24 has occurred or when scrapping the vehicle, the guide piece 24 molded from the relatively high-grade resin can be easily detached and separated from the anchor plate 12. Because of this, the loss cost can be lowered even more and the cost can be reduced even more.

Moreover, in contrast to a case where the guide piece 24 covers the outer peripheral end surface 12C of the anchor plate 12, molding burrs can be suppressed from forming on the outer peripheral portion of the guide piece 24, and the guide piece 24 can be suppressed from being broken due to contraction after the molding of the guide piece 24. Moreover, in contrast to a case where the guide piece 24 covers the outer peripheral end surface 12C of the anchor plate 12, defects can be suppressed from arising in the guide piece 24 due to movement of the molding die for the guide piece 24.

Further, the locking grooves 18 are formed in the area around the through hole 16 in the anchor plate 12, and the guide piece 24 enters and is locked in the locking grooves 18. For this reason, the occurrence of variations in contraction after the molding of the guide piece 24 and rattling caused by the contraction of the guide piece 24 can be suppressed, deformation and so forth caused by temperature change at the time of use of the through anchor 10 can be suppressed, and positional misalignment of the guide piece 24 with respect to the anchor plate 12 can be suppressed. Because of this, the precision of the width dimension L of the insertion hole 26 in the guide piece 24 can be raised, the moving performance of the webbing 30 in the lengthwise direction with respect to the insertion hole 26 can be raised, and folding-over of the webbing 30 inside the insertion hole 26 and bias (so-called jamming) of the webbing 30 toward one lengthwise direction side of the insertion hole 26 can be suppressed from occurring.

Moreover, the cover 36 is fastened to the anchor plate 12 and the guide piece 24, and the cover 36 covers the vehicle width direction insides (cabin sides) of the anchor plate 12 and the guide piece 24 outside the whole circumference of the insertion hole 26. For this reason, the cover 36 can conceal the anchor plate 12. Moreover, for example, even if molding burrs form on the outer peripheral end surface of the guide piece 24 (the section that is exposed with respect to the anchor plate 12), the cover 36 can conceal the molding burrs. Because of this, the appearance of the through anchor 10 can be improved. Moreover, the appearance of the through anchor 10 can be easily and effectively changed by changing the fastened cover 36. In particular, just by fastening a cover 36 of a different color, the color of the through anchor 10 can easily be made to correspond to the tones inside the cabin even if an identical part is used for the anchor plate 12.

Moreover, the cover 36 is molded in a substantial plate shape from a relatively low-grade resin. Moreover, when the cover 36 has become broken, the anchor plate 12 and the guide piece 24 do not need to be replaced and can be reutilized when the cover 36 is replaced. For this reason, the cost of the through anchor 10 can still be lowered and the through anchor 10 can still be made compact and lightweight.

In the present embodiment, the cross-sectionally triangular locking grooves 18 having long recessed shapes were formed and serving as the locking portions in the anchor plate 12. However, the locking portions may also be arranged dispersedly or arranged in a grid-like manner and formed in the anchor plate 12. Moreover, convex locking portions may also be formed on the anchor plate 12. Further, the locking portions may also be column-like or bell-like with a polygonal shape (triangular shape, rectangular shape, trapezoidal shape, pentagonal shape, hexagonal shape, etc.), a circular shape, an elliptical shape, a semicircular shape, or a semi-elliptical shape, or may be hemispherical or semi-elliptical and spherical (it may be a shape whose distal end is cut and whose distal end surface is made perpendicular or inclined with respect to its axial direction; the axial direction may stand up or be made parallel with respect to the anchor plate 12), and the cross-sectional shape of the locking portions may be a polygonal shape (triangular shape, rectangular shape, trapezoidal shape, pentagonal shape, hexagonal shape, etc.), a semicircular shapes, or a semi-elliptical shape. Moreover, hole-like locking portions may also be formed through the anchor plate 12, and, for example, the anchor plate 12 may also be given a bent shape displaced in the thickness direction and concave locking portions or convex locking portions may also be formed on the vehicle width direction inside surface and the vehicle width direction outside surface of the anchor plate 12.

Moreover, in the present embodiment, the locking portions were disposed in the vehicle width direction inside surface and the vehicle width direction outside surface of the anchor plate 12 on the upper side and the lower side of the through hole 16. However, the locking portions may also be disposed on either one of the vehicle width direction inside surface and the vehicle width direction outside surface of the anchor plate 12, and the locking portions may also be disposed on the peripheral edge of the through hole 16. Moreover, the locking portions may also be disposed on one of the upper side and the lower side of the through hole 16 in the anchor plate 12, and the locking portions may also be disposed on the whole circumference of the through hole 16 in the anchor plate 12. Moreover, the locking portions may also be disposed on the entirety of at least one of the vehicle width direction inside surface or the vehicle width direction outside surface of the anchor plate 12.

Further, in the present embodiment, a predetermined number of long convex portions or concave portions may also be disposed in at least one of the vehicle width direction inside surface or the vehicle width direction outside surface of the sliding surface 28 of the guide piece 24. In this case, it is preferred that the convex portions or the concave portions be inclined with respect to the vehicle width direction. Further, they may also be arranged symmetrically with respect to the vehicle front-and-rear direction centerline of the sliding surface 28. Moreover, the heights of convex portions adjacent to each other may be made identical or may differ. Moreover, convex portions whose heights differ may also be alternately arranged in the vehicle front-and-rear direction, or the heights of the convex portions may also be made gradually higher or lower, the closer the convex portions are to the vehicle front-and-rear direction center side. Further, the convex portions may be given an identical maximum height in the lengthwise direction center (vehicle width direction center); moreover, the heights of the convex portions may be varied in a wave-like manner or a step-like manner along the lengthwise direction of the convex portions, or the heights of the convex portions may also be made gradually higher or lower from the lengthwise direction centers of the convex portions toward both lengthwise direction ends (the heights of convex portions adjacent to each other may be identical or may differ in the identical vehicle width direction positions of the convex portions).

Moreover, in the present embodiment, the guide piece 24 was integrally molded on the anchor plate 12. However, the guide piece 24 may also be molded separately from the anchor plate 12 and thereafter secured to the anchor plate 12. In this case, it is preferred that the guide piece 24 be configured by plural components, that each of the components be fastened to the anchor plate 12, and that each of the components be physically fastened by ultrasonic welding or the like. Because of this, even when the webbing 30 is withdrawn by the occupant at the time of a vehicle collision, it can be ensured that the guide piece 24 will not come off of the anchor plate 12. Moreover, in processing the through anchor 10, just by releasing the fastening of the components, the guide piece 24 can be separated from the anchor plate 12, and the anchor plate 12 can be reutilized.

Further, in the present embodiment, the cover 36 covers the vehicle width direction inside surface of the anchor plate 12. However, the cover 36 may also additionally cover the entire outer peripheral end surface 12C of the anchor plate 12, and the cover 36 may also cover substantially all of the anchor plate 12 including the bolt fitted into the securing hole 14 in the anchor plate 12 and the vehicle width direction outside surface of the anchor plate 12.

Moreover, in the present embodiment, the lower end surface of the anchor plate 12 was brought into contact with the upper surface of the contact plate 38 of the cover 36. However, the lower end surface of the anchor plate 12 does not have to be brought into contact with the upper surface of the contact plate 38 of the cover 36. Moreover, contact ribs whose cross sections are triangular, rectangular (including square or trapezoidal), or semicircular may also be formed along the vehicle width direction on, for example, the vehicle front side end portion and the vehicle rear side end portion of the upper surface of the contact plate 38 of the cover 36. In this case, dimensional error of the anchor plate 12 and the cover 36 is absorbed as a result of the contact ribs contracting and deforming as needed when the lower end surface of the anchor plate 12 is brought into contact with them.

Further, in the present embodiment, the cover 36 was an integrated part. However, the cover 36 may also be configured by plural divided parts (e.g., divided parts in the up-and-down direction or the vehicle front-and-rear direction). In this case, each of the divided parts is fastened to at least one of another divided part, the anchor plate 12, or the guide piece 24.

Moreover, in the present embodiment, the through anchor 10 was applied to a slip joint. However, the through anchor 10 may also be applied to a tongue.

REFERENCE SIGNS LIST

10 Through Anchor
12 Anchor Plate (Main Body Member)
12C Outer Peripheral End Surface
14 Securing Hole (Attachment Portion)
16 Through Hole
18 Locking Groove (Locking Portion)
24 Guide Piece (Sliding Supporting Member)
30 Webbing
36 Cover (Covering Member)

The invention claimed is:

1. A through anchor comprising:
   a main body member, in which is formed a through hole through which is inserted webbing worn by an occupant of a vehicle; and
   a sliding supporting member:
   that is secured to an area around the through hole, but not at an entire outer peripheral end surface of the main body member, in a state in which the sliding supporting member sandwiches the main body member from front and back, and a portion of the sliding supporting member between an inner periphery surface of the sliding supporting member and an entire area of the main body member surrounded by the sliding supporting member is solid all around the through hole,
   that is not connected integrally to the outer peripheral end surface of the main body member, and
   that is configured such that the inner periphery surface of the sliding supporting member slidably supports the webbing.

2. A through anchor comprising:
   a main body member that is equipped with an attachment portion attached to a vehicle and in which is formed a through hole for webbing worn by an occupant; and
   a sliding supporting member:
   that is placed on an inner periphery of the through hole in the main body member and a peripheral edge of the through hole, an inner periphery surface of the sliding supporting member configured for guiding sliding of the webbing,
   that sandwiches the main body member from front and back and has a portion between the inner periphery surface and an entire area of the main body member surrounded by the sliding supporting member that is solid all around the through hole, and
   that is not connected integrally to the outer peripheral end surface of the main body member.

3. The through anchor according to claim 1, further comprising a locking portion that is disposed in an area around the through hole in the main body member, and that locks the sliding supporting member.

4. The through anchor according to claim 2, further comprising a locking portion that is disposed in an area around the through hole in the main body member, and that locks the sliding supporting member.

5. The through anchor according to any one of claim 1 to claim 4, further comprising a covering member that is fastened to at least one of the main body member or the sliding supporting member, and that covers the main body member.

6. The through anchor according to claim 5, wherein the covering member covers an outer peripheral end surface of the sliding supporting member.

7. The through anchor according to claim 5, wherein the covering member covers the main body member outside the whole circumference of the through hole.

\* \* \* \* \*